United States Patent [19]

Nowotny

[11] 3,787,256

[45] Jan. 22, 1974

[54] NONWOVEN SHEET STRUCTURES FROM MODIFIED POLYOLEFIN FIBERS

[75] Inventor: Kurt A. Nowotny, Camas, Wash.

[73] Assignee: Crown Zellerbach Corporation, San Francisco, Calif.

[22] Filed: Sept. 13, 1971

[21] Appl. No.: 180,212

[52] U.S. Cl.................. 156/62.2, 8/115.5, 156/62.4, 156/62.6, 162/146
[51] Int. Cl. .............................................. D21j 3/00
[58] Field of Search . 156/62.4, 62.6, 62.2; 264/109, 264/115, 128; 162/141, 146, 157; 8/115.5

[56] References Cited
UNITED STATES PATENTS

| | | | |
|---|---|---|---|
| 3,043,787 | 7/1962 | Bonvicini et al.............. | 117/132 CF |
| 3,228,744 | 1/1966 | Karn................................... | 8/115.5 |
| 3,669,829 | 6/1972 | Caldo et al. ........................ | 162/146 |

*Primary Examiner*—Alfred L. Leavitt
*Assistant Examiner*—Caleb Weston
*Attorney, Agent, or Firm*—Kolisch, Hartwell & Dickinson

[57] ABSTRACT

A sheet structure prepared from modified polyolefin fibers and a method of preparation of the structure. The fibers are modified by introducing thereinto halide groups and acid groups with disassociatable hydrogen ions, and from this a stabilized water dispersion is prepared. A mat is prepared from the dispersion of fibers.

8 Claims, No Drawings

NONWOVEN SHEET STRUCTURES FROM MODIFIED POLYOLEFIN FIBERS

This invention relates to the production of nonwoven sheet structures from polyolefin fibers. More particularly, the invention relates to a novel process or method for preparing a structure such as a mat from such fibers, and to new and unique products prepared by the process.

Polyolefin fiber, while a readily available material, has not been regarded in the past as suitable for incorporation into a nonwoven structure such as a mat or sheet, utilizing the so-called "wet" process which typifies the manufacture of paper. The usual wet process involves preparing a dispersion of fiber in water, and preparing from this dispersion a mat with the subsequent removal of free water. Attempts to utilize polyolefin fiber have not been successful, due to the extreme difficulty in preparing and retaining a uniform dispersion of the synthetic material. Thus, when the material has been used alone and using a wet process, it is next to impossible to prepare an evenly distributed mat. Where combined with other fiber such as wood fiber, any mat which is produced is layered and nonuniform in character. The tendency of the fibers to retain entrapped air, and their relatively low density (approximately 0.9), have added to the problem, since these properties tend to cause the fibers to "cream" to the surface under the influence of gravity, or to agglomerate under the influence of centrifugal forces.

In those instances where a mat has been prepared from the fiber, such has generally been characterized by relatively low strength characteristics. The fibers tend to slide on each other with very little interfiber friction being evidenced. Similar difficulties arise in producing products including a resin binder, where relatively low resin retention has been noted.

In general terms, this invention contemplates the manufacture of nonwoven structures from polyolefin fiber, using a process where the fiber, prior to the preparation of a water dispersion, is modified through the introduction into the fiber of halogen groups and acid groups containing disassociatable hydrogen ions. The modification, being a chemical modification of the macromolecules which form the fiber, is a permanent one. Thus, the advantages obtained by the modification are not easily subsequently lost, as is the case of a process wherein improved workability is obtained by the addition of an additive that absorbs on the fiber surface. Absorption is of a physical nature, with Van Der Waal's forces active only, and the additives and the properties that they provide can be readily lost. In addition, such additives, while being useful for dispersion purposes, can and do hurt other properties of the fiber, like their ability to form mechanical bonds, and the ease with which they form heat bonds, their compatability with other additives, etc.

A general object of the invention, therefore, is to provide an improved process for preparing a nonwoven structure, permitting the production of products having improved strength and other properties.

Another object is to provide a novel wet process for preparing a nonwoven structure, characterized by a more readily obtained water dispersion than previously possible.

Yet another object of the invention is to provide a novel method of preparing a nonwoven structure, featuring a wet process for preparing a mat from modified polyolefin fiber, where the mat is subsequently heat treated to effect bonding of the fiber in the mat.

With the process of the invention, nonwoven structures can be prepared using a wet process from polyolefin fibers alone, or a blend of polyolefin fiber together with other fiber, such as wood fiber. This, of course, permits the production of a vast variety of specialty structures, for use in different types of applications.

Yet a further object of the invention is to provide novel products producible by the process of the invention.

These and other objects and advantages are attained by the invention, which will become more fully apparent from the following description, taken in conjunction with certain specific examples included for the purpose of illustration.

The polyolefin fibers usable according to the invention comprise fibers of finite length, usually less than about 50 millimeters and ordinarily in range of 2 to 25 millimeters, prepared from such polyolefins as polyethylene, polypropylene and polybutylene. All of such fibers, which are polymers of olefins having 2 to 4 carbon atoms, when mixed with water as an initial step in a wet process, tend to agglomerate and surface in the water, rendering them difficult if not impossible to prepare into a mat by such a process. Also, untreated fibers having a length greater than about 25 millimeters are difficult to form into webs because of their length.

In addition to conventional polyolefin fibers, which may be referred to as staple fibers, fibers may be utilized according to this invention which have been manufactured in such a manner as to impart a large surface area to the fibers. The latter type of fibers may be manufactured in accordance with the teachings of U.S. application Ser. No. 874,697 (filed Nov. 6, 1969), now abandoned U.S. application Ser. No. 27,053 (filed Apr. 9, 1970), now abandoned and U.S. application Ser. No. 69,194 (filed Sept. 3, 1970) now abandoned. The polyolefin fibers of these applications have a length between about 0.2 to 3.0 millimeters or larger, and have a considerably greater surface area than the usual staple fibers. For example, polyethylene and polypropylene fibers prepared according to the processes described in the aforementioned applications may have a surface area in excess of 1 $m^2$/gram and generally in excess of 25 $m^2$/gram, whereas the usual polyolefin staple fibers have a surface area less than about 1 $m^2$/gram. The fibers with large surface areas are formed from polyolefins having an extremely high viscosity average molecular weight, which in the cae of linear polyethylene and polypropylene is between about 500,000 and 20,000,000 or above.

To overcome problems of dispersion, and also for the purposes of obtaining an increase in strength properties of a mat through greater interfiber adhesion, I propose a chemical modification of the surfaces of the polyolefin fibers by processing them to introduce on the fibers halide groups and acid groups containing diassociateable hydrogen ions. With such a modification, quite surprisingly the fibers are transformed into a condition which permits their ready dispersion in water, and the retention of the dispersion obtained for the purpose of preparing a mat from such fobers. Further, markedly increased strength properties are obtained, as well as other advantages, such as increased retention and effectiveness of a resin binder which may be incorporated therewith. The method in no way impairs other properties of the fibers, such as their ability to form mechanical bonds with each other, their ability to form heat bonds, their compatability with other additives, etc.

Exemplary of the processes that may be utilized to modify the fibers are a chlorosulfonation process involving the replacement of hydrogen in the macromolecules with sulfonic acid groups, and a chlorocarboxylation process where hydrogen is replaced by carboxyl groups.

The chlorosulfonation process which is utilized may be a gas-phase process, where the fiber is placed in a reactor, and such reactor is then filled with a mixture of chlorine and sulfur dioxide gases. The chlorine and sulfur dioxide gases interract to produce sulfonyl chloride in the reaction process. The reaction is catalyzed by the presence of ultraviolet light. When the sulfonyl chloride formation is carried on in the presence of a polyolefin fiber, the sulfonyl chloride which is produced reacts with the fiber, with the replacement of hydrogen in the fiber molecules with chlorosulfonyl groups, and with the formation of by-product hydrogen chloride. Depending upon the conditions under which the chlorosulfonation is carried out, there usually is some direct chlorination and sulfonation of the polyolefin with the chlorine and sulfur dioxide gases. The amount of these side reactions may be controlled by controlling the proportions of the chlorine and sulfur dioxide used in the chlorosulfonation. Practicing the present invention, ordinarily the percentage of sulfur dioxide present in the gas mixture employed in the chlorosulfonation ranges from about 15 to 85% (molar proportions).

After chlorosulfonation of the fiber, the same is washed, with hydrolyzing of the sulfonyl chloride groups in the modified fiber to produce sulfonic acid groups.

In processing the polyolefin staple fibers, it may be desirable initially to wash them, as with a soap or detergent solution, to remove paraffin oil and the like which sometimes is applied during manufacture of the fiber.

The following examples illustrate the preparation of modified polyolefin fibers usable in the production of nonwoven sheet structures, as contemplated by the invention.

EXAMPLE I

Six denier, 6 millimeter long, polypropylene staple fibers were first washed with a weak detergent solution and then air dried. This was followed by a fluffing or fiber separation step, by blowing a stream of compressed air into the mass of fibers. A mass of such fibers was then placed in a reaction vessel equipped with a gas inlet and outlet to a manometer and a thermometer. The vessel then was evacuated to approximately 15 millimeters mercury pressure, and subsequently back filled to atmospheric pressure with a 1:1 (molar basis) mixture of sulfur dioxide and chlorine. The contents of the vessel, which had glass walls, was exposed for ten minutes to a 250 amp ultraviolet lamp energized outside the vessel. The vessel was rotated slowly (1/4 revolution per minute) to prevent heat buildup by reason of lamp exposure.

After one hour, and with stabilization of pressure and temperature (the pressure dropped below atmsopheric and a temperature rise of about 16°F. was noted), additional chlorine and sulfur dioxide was introduced, in a 1:1 ratio, to bring the pressure back up to atmospheric. The fibers were exposed to the sulfur dioxide and chlorine mixture for an additional 2 hours. During this time the ultraviolet lamp was energized twice for periods of ten minutes each. After the expiration of the 2 hour period, the fibers were removed from the vessel, boiled in water, rinsed with water, and finally dried.

The modified fibers so produced were analyzed to determine the extent of substitution in the fibers of chlorine and sulfonic acid groups. Such substitution, expressed as weight percent chlorine and weight percent sulfonic acid was determined to be 7.5% (chlorine) and 4.03% (sulfonic acid).

In another chlorosulfonation preparation, polypropylene staple fibers were processed as set forth above, with exposure to daylight rather than the rays of an ultraviolet lamp. In this instance, the modified fiber was determined to contain 3.7% chlorine and 4.48% sulfonic acid groups.

A chlorocarboxylation was also performed. The same procedure was employed as utilized in the chlorosulfonation, save that a mixture of carbon dioxide and chlorine (1:1 molar ratio) was utilized, rather than a chlorine and sulfur dioxide mixture. The fiber was exposed to ultraviolet light. An analysis of the modified fiber produced indicated a chlorine substitution, expressed as weight percent chlorine in the fiber, of 6.19%, and a carbonyl substitution, expressed as weight percent of carboxyl groups, of 0.79%.

When carbon monoxide is employed, phosgene is produced as an intermediate which then effects the chlorocarboxylation in a manner similar to the formation of sulfonyl chloride as an intermediate when chlorosulfonation is carried out. It is apparent that phosgene itself may be initially employed as the reac-

TABLE I

| Preparation No. | Fiber Size (denier, length in mm) | Treatment | | % CL | % $SO_3H$ | % $CO_2H$ | Ultra-violet Exposure (minutes) | | |
|---|---|---|---|---|---|---|---|---|---|
| | | | | | | | initial | first | second |
| POLYPROPYLENE | | | | | | | | | |
| 1 | 3, 12 | 1:4 $SO_2$-$Cl_2$ | w/o UV | 0.3 | 1.38 | | | | |
| 2 | 3, 12 | " | w UV | | | | 10 | 10 | 10 |
| 3 | 6, 6 | " | in daylight | 2+ | ? | | | | |
| 4 | 6, 6 | " | w UV | 8.31 | 2.92 | | 3 | 6 | 16 |
| 5* | 6, 6 | 1:1 $SO_2$-$Cl_2$ | in daylight | 3.70 | 4.48 | | | | |
| 6* | 6, 6 | " | w UV | 7.5 | 4.03 | | 10 | 10 | 22 |
| 7 | 6, 6 | " | w UV | 4.53 | 3.65 | | 10 | 10 | 10 |
| 8 | 3, 12 | 4:1 $SO_2$-$Cl_2$ | in daylight | 0.85 | 1.68 | | | | |
| 9 | 6, 6 | " | w UV | 2.05 | 2.41 | | 3 | 6 | 27 |

TABLE I—Continued

| Prepara-tion No. | Fiber Size (denier, length in mm) | Treatment | % CL | % SO₃H | % CO₂H | Ultra-violet Exposure (minutes) | | |
|---|---|---|---|---|---|---|---|---|
| | | | | | | initial | first | second |
| 10* | 6, 6 | 1:1 CO₂-Cl₂ w UV | 6.19 | | 0.79 | 4 | 19 | 25 |
| 11 | 6, 6 | "  w UV | 6.02 | | 0.59 | 10 | 10 | 10 |
| 12 | 6, 6 | "  CO-Cl₂ w UV | 4.51 | | 0.35 | 10 | 10 | 10 |
| 13 | 6, 6 | "  CO-Cl₂ w UV | 4.92 | | 0.62 | 10 | 10 | 10 |
| | | | | POLYETHYLENE | | | | |
| 14 | 3, 6 | 1:4 SO₂-Cl₂ w UV | 2.86 | 2.07 | | 1.5 | 9.5 | |
| 15 | 3, 12 | " | 5.11 | 2.08 | | 10 | 20 | |
| 16 | 3, 6 | 4:1 SO₂-Cl₂ w UV | 0.78 | 0.96 | | 10 | 10 | 10 |
| 17 | 3, 6 | 1:1 CO₂-Cl₂ w UV | 6.88 | | 1.34 | 10 | 20 | 20 |
| 18 | 3, 6 | 1:1 CO-Cl₂ w UV | 4.13 | | 0.37 | 15 | 15 | 15 |

*above described preparations tant gas instead of a mixture of carbon monoxide and chlorine.

The following table summarizes the conditions used in the above described and other preparations of modified staple fiber, and the results obtained in such preparations.

EXAMPLE II

Polyethylene fibers having a surface area exceeding 1.0 m²/gm (29.4 m²/gm and a viscosity average molecular weight of 2.9x10⁶) were chlorosulfonated in a manner somewhat like the procedure described in Example I. After the fibers had been placed in a reaction vessel, such was evacuated to a pressure of 24.0 millimeters of mercury. Such vessel was backfilled with sulfur dioxide, to bring the pressure of the vessel to 173 millimeters of mercury, and then backfilled with chlorine to bring the pressure within the vessel to approximately atmospheric.

After a period of about 1 hour the temperature within the vessel stabilized. The gas mixture within the vessel was removed by evacuation to lower the pressure of the vessel to 20 millimeters of mercury. The vessel was then opened up and the fibers washed with water.

After removal of water and evacuation of the vessel, additional sulfur dioxide and chlorine were added following the procedure of the first addition of such materials. The fiber content of the vessel was then chlorosulfonated for an additional hour. The vessel was then evacuated, additional sulfur dioxide and chlorine introduced, and chlorosulfonation continued for another hour.

Fibers processed as above were easily dispersed in water, and remained well dispersed with only gentle stirring. Fibers without treatment floated on water and could not be maintained in a dispersed state. Mats formed from untreated fibers because of lack of water dispersibility therein, could not be prepared into an evenly distributed mat. Those subject to chlorosulfonation, when deposited on a hand screen, resulted in a mat with even texture and good fiber distribution.

The following example illustrates the preparation of sheet structures from a blend of polyolefin fiber and wood fiber using both modified and unmodified fiber as the polyolefin fiber.

EXAMPLE III

Polypropylene staple fibers were processed as set forth in Example I, in a chlorosulfonation process, and employing as treating gas a mixture of sulfur dioxide and chlorine (1:3 molar ratio). Modified fibers were produced having substitution of chlorine and sulfonic acid groups (expressed as weight percent) of approximately 0.3% and 1.38%, respectively.

A water dispersion was prepared from a blend of such modified polyolefin fiber and birch kraft fiber (50% polyolefin fiber in the blend). A hand sheet was prepared from such blend, using a hand sheet mold with a coarse nylon screen placed over the mold wire. The fiber was deposited onto the screen with pouring of the dispersion over the screen and mold wire. The hand sheet was removed from the mold with removal of the nylon screen, and pressed between blotters, with subsequent drying, using a felted steam cylinder.

Another hand sheet was prepared using the same polypropylene fiber, but without chlorosulfonation of the fiber. Hand sheet preparation was carried out in the same manner, including using a blend of 50% fiber and 50% birch kraft. Difficulties were encountered in obtaining a uniform water dispersion of the polypropylene fibers, with it being necessary continually to agitate the fiber and water mixture and the fibers tending to hang up on any stirrer employed.

The following table sets forth certain physical characteristics of the two structures obtained. It will be noted that the structures including the modified fiber showed significantly better strength characteristics, including tensile and stretch, and the stiffness of the product was also greater.

TABLE II

| Properties Measured | Structure | |
|---|---|---|
| | A* | B** |
| Basis Weight, lb./ream | 58.3 | 58.3 |
| Caliper, 0.001 inches | 20.16 | 19.80 |
| Tensile, lb./inch | 3.41 | 4.07 |
| Stretch, % | 2.3 | 2.9 |
| TEA*** ft.-lb./ft.² | 0.48 | 0.67 |
| Stiffness (Clark) | 14.63 | 15.17 |

* prepared with unmodified fiber
** prepared with modified fiber
*** Tensile Energy Absorption As discussed briefly earlier, improved resin binder retention is noted with structures prepared according to the invention, as illustrated by the following example.

EXAMPLE IV

A dispersion of fiber prepared as in Example III, and comprising 50% modified polypropylene fiber and 50% wood fiber, was utilized in preparing a hand sheet as set forth in Example II. After drying of the hand sheet, the sheet was immersed in an aqueous latex mixture, comprising 10% solids. The resin in such latex mixture was Hycar 140, from B.F. Goodrich & Company, a soflt acrylic resin. After immersion, the hand sheets were pressed between blotters to remove excess latex and then dried between fresh blotters on a felted steam cylinder.

Another hand sheet was prepared from a resin blend as prepared in Example II, utilizing unmodified polypropylene fibers. These hand sheets were again immersed in the latex mixture described, subsequently removed, and then dried.

The sheet structures so produced were analyzed for binder retention, tensile strength and TEA. The following table summarizes the results obtained.

TABLE III

| Properties Measured | Structure | |
|---|---|---|
| | A* | B** |
| % by weight binder in hand sheet | 19 | 26 |
| Tensile, lb./inch | 9.36 | 13.63 |
| TEA, ft.-lb./ft.$^2$ | 5.69 | 8.81 |

* prepared with unmodified fiber
** prepared with modified fiber

It will be noted from the above that with the modified polyolefin fiber, significantly greater binder retention is realizable, together with certain strength characteristic improvements. In addition, increased effectiveness of the binder is obtained due to the greater wetting ability of the modified fibers. This latter improvement permits lower amounts of binder to be employed, thereby improving the hand of nonwoven products formed therefrom.

The following example illustrates the preparation of sheet structures from both polyethlene and polypropylene fibers, modified and unmodified.

EXAMPLE V

Hand sheets were prepared using a wet process from a dispersion of fiber and water. In each instance, the fiber comprised a blend of 50% polyolefin and 50% alder kraft fiber. Some of the structures were prepared from unmodified polyolefin fibers, whereas others, as indicated in the table, were prepared from modified fibers.

The modified fibers were ones modified using a chlorosulfonation process, the modified polypropylene fiber being the one described in preparation 8 of Table I, and the modified polyethylene fiber being the one described in preparation 16 of Table I. In preparing the final sheet structures, an acrylic latex resin binder was included, on a 25% by weight add-on basis.

TABLE IV

| Properties Measured | Structure | | | |
|---|---|---|---|---|
| | Polypropylene Fiber | | Polyethylene Fiber | |
| | A* | B** | A* | B** |
| Basis Weight, lb./3000 ft.$^2$ | 39.4 | 40.4 | 42.5 | 42.7 |
| Caliper, 0.001 in. | 14.74 | 14.28 | 14.02 | 14.38 |
| Tensile, lb./in. | 1.95 | 3.04 | 2.08 | 2.98 |
| Rupture Energy, ft.-lb./ft.$^2$ | 1.43 | 2.56 | 1.45 | 1.94 |
| Stiffness (Clark) | 10.91 | 12.26 | 10.94 | 12.30 |

* prepared with unmodified fiber
** prepared with modified fiber

EXAMPLE VI

Comparing sheet structures prepared from polyolefin fibers modified by a chlorosulfonation process, and sheet structures prepared from fibers modified by a chlorocarboxylation process, the modified fibers produced by preparations 6 and 12 in Table I were utilized in preparing hand sheets. In each instance, a blend of 50% modified fiber and 50% alder kraft fiber was prepared and dispersed in water. After preparation of the hand sheet, 25% by weight acrylic latex was introduced to the sheet, on an add-on basis, as a binder. The following table summarizes physical characteristics noted in sheet structures so prepared.

TABLE V

| Properties Measured | Structure | |
|---|---|---|
| | A* | B** |
| Basis Weight, lb./3000 ft.$^2$ | 36.7 | 38.8 |
| Caliper, 0.001 in. | 13.06 | 13.48 |
| Tensile, lb./in. | 2.94 | 3.01 |
| Stretch, % | 6.5 | 5.9 |
| Rupture Energy, ft.-lb./ft.$^2$ | 1.67 | 1.59 |
| Elastic Modulus, lbs./in.$^2 \times 10^{-4}$ | 1.06 | 1.37 |

* prepared with chlorosulfonated fiber
** prepared with chlorocarboxylated fiber According to the invention, it is possible, using a wet process, to prepare a sheet structure with the fibers in the structure in their fibrous state. To introduce different characteristics into the sheet structure so obtained, the fibers therein may be subjected to heating, as illustrated by the following example.

EXAMPLE VII

Hand sheets were prepared from polyethylene fibers modified by a chlorosulfonation process, as described in Example III in structure B. The fibers were dispersed in water and formed into a hand sheet using a sheet mold. After preparation of the hand sheet, it was heated to a temperature of approximately 150° C., a temperature slightly above the melting point of the polyethylene fiber utilized.

Heating of the sheet produced partial fusing of the fibers. On subsequent cooling, the fibers interadhered through fusion bonding, and an opaque, smooth-surfaced sheet resulted. The sheet had considerably greater tensile strength than the fiber structure from which the sheet was prepared. Further, the sheet exhibited increased drape and flexibility. The opacity of the sheet indicated only partial melting of the fibers. With heating carried out for a longer time, there was complete melting of the polyolefin material, and on subsequent cooling, the usual transparent film associated with the polyolefin was observed.

EXAMPLE VIII

In another preparation, a laminate was prepared by placing a hand sheet prepared as in Example VII against a sheet of cottom cheesecloth. On subsequent heating of the sheet, as set forth in Example VII, with partial melting of the fibers, such were caused to bond with each other, as well as with the threads of the cheesecloth sheet. The laminate produced exhibited good tear resistance, and had excellent tensile properties. One side of the sheet had the same appearance as the sheet prepared in Example VII.

As already indicated, the use of modified fiber has been found to increase the resin binder retention in the sheet produced. Any of the usual resin latices are usable in this type of manufacture, including such latices as acrylic, styrene butadiene, butadiene acrylonitrile, etc.

As indicated above, when a hand sheet is prepared from a water dispersion of modified polyolefin fiber, with the draining of a hand sheet and subsequent drying to remove free water, a sheet results which exhibits greater strength characteristics than a sheet prepared with unmodified fiber. This is felt to be explained by the fact that with modification of the fiber, there is a decreased tendency of the fibers to slide on each other, i.e., modification imparts greater interfiber friction. Further, with fibers modified to have substituted in the micromolecules which make up the fibers either sulfonic acid or carboxylic acid groups, retained water moledules in the sheet structure function to bridge acid groups forming part of the fibers to promote adhesion between the fibers.

In sheet structures prepared from blends of natural wood fiber and modified polyolefin fiber, a more homogeneous type product is produceable than is possible using untreated fiber. It is felt that an important reason for this result is the more stable dispersions that result when the blend of fiber is dispersed in water, and the decreased tendency in such a dispersion for the polyolefin fiber to separate out and "cream" to the surface of the water. In this connection, the presence of the wood fiber in the blend plays a significant part, since wood fibers in general can be prepared into fairly stable dispersions, and the wood fiber in the blend mixture tends to function as a stabilizer for the polyolefin fiber.

It should also be noted that when a sheet structure is prepared from a blend of wood fibers and modified polyolefin fibers, and such is then heated at a temperature slightly above the melting point of the polyolefin fibers for a time insufficient to melt completely all the polyolefin material (as evidenced by retained opacity in the sheet), the wood fibers in the sheet will be relatively unaffected by the temperature employed. The final sheet will comprise polyolefin material fuse bonded into a mass and surrounding what are essentially discreet wood fibers distributed in the sheet. For example, a unique type of product is produceable using the procedure set forth in Example VI, with such procedure changed to the extent that a blend of modified polyethylene fiber and wood fiber is utilized in preparing the hand sheet.

In the manufacture of a sheet, a product may be obtained which has many of the characteristics of conventional paper products, utilizing blends of wood fiber and modified polyolefin fiber, with the polyolefin fiber comprising as much as up to 75% by weight of the blend.

It should be obvious that with the invention, a sheet structure may be prepared using a wet process, having a variety of different types of physical characteristics. The sheet products have a wide variety of uses. For instance, the sheet structures produced directly by the wet process, and without any heat bonding, are utilizable as filter media, noise suppressors, etc. The heat treated sheets produced, being tasteless, odorless, heat sealable, mold resistant, chemical resistant, and oil and grease resistant, make good covering and packaging materials.

It is claimed and desired to secure by Letters Patent:

1. A method of preparing a sheet product from polyolefin fibers, the polyolefins being polymers of olefins having from 2 to 4 carbon atoms and the fibers having a length not exceeding about 50 millimeters, the method comprising
processing the fibers by carboxylation or sulfonation to modify them by the introduction thereinto of carboxyl or sulfonic acid groups containing disassociatable hydrogen ions,
preparing a water dispersion of such modified fibers with such stabilized through the modification of the fibers, and
forming from such water dispersion a mat of fibers with free water removed from the fibers.

2. The method of claim 1 which further comprises immersing the modified fibers in an aqueous latex composition to produce retention on the modified fibers of the resin latex.

3. The method of claim 1 which further comprises the step of applying heat to the formed mat to produce softening of the fibers, and then cooling the mat to produce interadhesion through fusion bonding of the modified fibers in the mat.

4. The method of claim 3, wherein such heating is insufficient to integrate completely the fibers in the mat as evidenced by retained opacity in the mat.

5. The method of claim 1, wherein after processing of the fibers to modify them the fibers are separated from each other with a compressed stream of gas to promote dispersion of the fibers in water.

6. The method of claim 1, which further comprises mixing with the modified polyolefin fibers wood fibers to form a dispersion of mixed fibers.

7. The method of claim 1 wherein the polyolefin fibers have a surface area greater than 1.0 m$^2$/gm.

8. The method of claim 1 which further comprises preparing a laminate from the mat formed by placing a sheet of material against the mat, and applying heat to the laminate to produce softening and interadhesion of the modified fibers in the mat and adhesion of the fibers to the sheet in the laminate.

* * * * *